United States Patent [19]
Oshima

[11] Patent Number: 4,503,455
[45] Date of Patent: Mar. 5, 1985

[54] CONTROL SIGNAL GENERATOR FOR A TELEVISION SIGNAL CODEC
[75] Inventor: Toshio Oshima, Tokyo, Japan
[73] Assignee: Nippon Electric Co., Ltd., Tokyo, Japan
[21] Appl. No.: 464,257
[22] Filed: Feb. 7, 1983
[30] Foreign Application Priority Data
  Feb. 9, 1982 [JP] Japan .................................. 57-19121
  Feb. 9, 1982 [JP] Japan .................................. 57-19122
[51] Int. Cl.³ .......................... H04N 9/46; H04N 5/04
[52] U.S. Cl. ..................................... 358/19; 358/149
[58] Field of Search ..................... 358/13, 19, 17, 149, 358/150

[56] References Cited
U.S. PATENT DOCUMENTS
  4,203,135 5/1980 Sasaki ................................. 358/149

Primary Examiner—John C. Martin
Assistant Examiner—Michael Dunnam
Attorney, Agent, or Firm—Sughrue, Mion, Zinn, Macpeak, and Seas

[57] ABSTRACT

In a control signal generator, a first frequency dividing circuit controllably frequency divides a television subcarrier signal to deliver a first frequency divided signal to a phase lock loop, which drives a logic circuit to produce a control signal for use in a television signal codec. Together with the first frequency divided signal, a second frequency divided signal produced by frequency dividing horizontal or vertical synchronizing signals, is supplied to a phase control circuit for phase controlling the first frequency divided signal so as to keep a phase difference which the first frequency divided signal has relative to the second one, within a prescribed tolerance. When the phase difference is smaller and not smaller than the tolerance, a switch may selectively supply the phase lock loop with the first and the second frequency divided signals, respectively, with the first frequency divided signal phase controlled to the tolerance if the phase difference is not within the tolerance.

5 Claims, 4 Drawing Figures

CONTROL SIGNAL GENERATOR FOR A TELEVISION SIGNAL CODEC

BACKGROUND OF THE INVENTION

This invention relates to a control signal generator for use in combination with a television signal codec, namely, a television signal encoder and/or a television signal decoder.

A television signal encoder is disclosed in U.S. Pat. No. 4,006,297 issued to Toshio Koga and assigned to the present assignee. One of control signals used in such a television signal encoder, is for suspending the encoding operation during each horizontal blanking period. More particularly, it is usual to raise the efficiency of encoding by making a television signal encoder encode only one horizontal blanking period in a first horizontal scanning line as a representative of like horizontal blanking periods which appear at regular intervals in the respective horizontal scanning lines. For a quantizer used in an encoder for a color television signal comprising video signals and color bursts, a similar control signal is used to carry out switching between quantization steps for each video signal and for each color burst because the video signal has a signal level which is very rapidly variable as compared with the color burst.

As will later be described with reference to one of several figures of the accompanying drawing, such a control signal may go out of phase synchronism with the horizontal synchronizing signals. In this event, a television signal decoder can not correctly reproduce an original television signal which is encoded by the encoder into an encoded television signal for conveyance to the decoder. For example, deterioration takes place in the encoding or the quantization characteristics when the control signal is out of the phase synchronism. The circumstances are not different even when the control signal is phase synchronized with the vertical synchronizing signals. Incidentally, a sequence of horizontal or vertical synchronizing signals will collectively be called a horizontal or a vertical synchronizing signal as the case may be.

SUMMARY OF THE INVENTION

It is therefore an object of the present invention to provide a generator for producing a control signal which is used in a television signal codec and will not go out of phase synchronism with a preselected one of a horizontal and a vertical synchronizing signal.

According to an aspect of this invention, there is provided a control signal generator for producing a control signal in phase synchronism with a synchronization signal preselected from a horizontal and a vertical synchronizing signal of a television signal and comprising first and second frequency dividing means, phase control means, and control signal producing means as follows.

The first frequency dividing means is for controllably frequency dividing a subcarrier signal of the television signal to produce a first frequency divided signal.

The second frequency dividing means is for frequency dividing the synchronization signal to produce a second frequency divided signal.

The phase control means is coupled to the first frequency dividing means and responsive to the first and the second frequency divided signals for phase controlling the first frequency divided signal so as to keep a phase difference which the first frequency divided signal has relative to the second frequency divided signal, within a prescribed tolerance.

The control signal producing means is responsive to the first frequency divided signal for producing the control signal.

According to another aspect of this invention, there is provided a control signal generator for producing a control signal in phase synchronism with a synchronization signal preselected from a horizontal and a vertical synchronizing signal of a television signal and comprising first and second frequency dividing means, switching and phase controlling means, and control signal producing means as follows.

The first frequency dividing means is for controllably frequency dividing a subcarrier signal of the television signal to produce a first frequency divided signal.

The second frequency dividing means is for frequency dividing the synchronization signal to produce a second frequency divided signal.

The switching and phase controlling means is responsive to the first and the second frequency divided signals for producing the first and the second frequency divided signals as a switched output signal when a phase difference which the first frequency divided signal has relative to the second frequency divided signal, is within and not within a prescribed tolerance, respectively. Furthermore, the switching and phase controlling means is coupled to the first frequency dividing means for phase controlling the first frequency divided signal so as to make the phase difference converge within the prescribed tolerance when the phase difference is not within the prescribed tolerance.

The control signal producing means is responsive to the switched output signal for producing the control signal.

DESCRIPTION OF THE PREFERRED EMBODIMENTS

Figure 1:
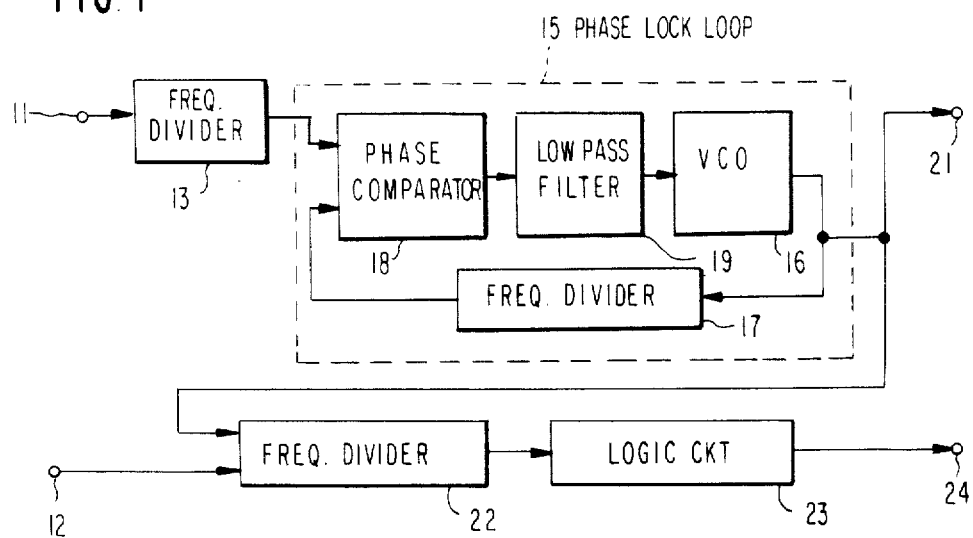
FIG. 1 is a block diagram of a conventional control signal generator for use in combination with a color television signal codec.

Referring to FIG. 1, a conventional control signal generator will be described at first in order to facilitate an understanding of the present invention. The control signal generator is for use in combination with a television signal codec (not shown). Merely for convenience of description, it will be assumed that the television signal codec is for dealing with a color television signal comprising video signals and color bursts and that the television signal is of the NTSC system.

The control signal generator has first and second generator input terminals 11 and 12 which are supplied with a subcarrier signal regenerated from burst-shaped signals included in the television signal and with horizontal synchronizing signals extracted from the television signal and having a horizontal scanning frequency $f_H$. A first frequency divider 13 is for frequency dividing the subcarrier signal by 455 to deliver a first frequency divided signal of a demultiplied frequency $f_H/2$ to a phase lock loop 15, which may be of the type revealed in U.S. Pat. No. 4,263,565 issued to Brian Astle and assigned to RCA Corporation.

The phase lock loop comprises a voltage controlled oscillator (VCO) 16 for generating a local signal of a frequency which is controllable near a sampling or clock frequency $f_S$. A local frequency divider 17 is for frequency dividing the local signal to produce a frequency demultiplied signal of a frequency which is nearly equal to the demultiplied frequency $f_H/2$. A phase comparator 18 is for phase comparing the frequency divided and demultiplied signals to produce a phase error signal, which is fed back to the voltage controlled oscillator 16 in the known manner through a low-pass filter 19. The local signal is delivered to a first generator output terminal 21 as a sampling or clock pulse sequence which has the sampling or clock frequency $f_S$ and in phase synchronism with the subcarrier signal.

The local signal is delivered furthermore to a second frequency divider 22, which is for frequency dividing the local signal into a second frequency divided signal and for resetting the second frequency divided signal with reference to the horizontal synchronizing signal to establish phase synchronism therebetween. A logic circuit 23, which may be a read-only memory, is responsive to the second frequency divided signal for supplying a second generator output terminal 24 with a control signal which has a predetermined pulse pattern in every horizontal scanning period.

If a phase jump occurs in the horizontal synchronizing signals, the second frequency divided signal is no more in phase synchronism therewith. When a horizontal synchronizing signal is followed by another horizontal synchronizing signal before lapse of the horizontal scanning period, a part of the predetermined pulse pattern is lost. When two consecutive horizontal synchronizing signals appear with an interval of time which is longer than the horizontal scanning period, a spurious pattern is added to the predetermined pulse pattern.

Figure 3:
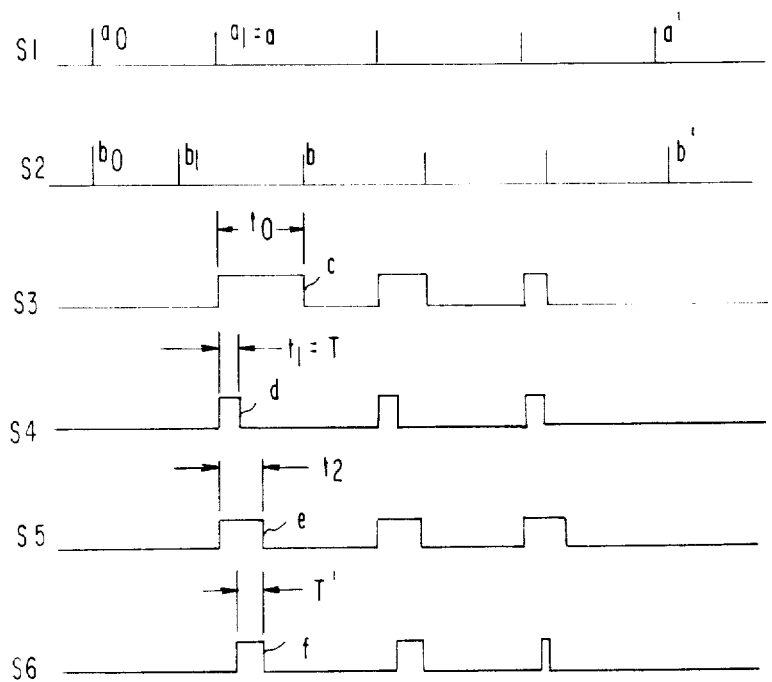
FIG. 3, drawn below FIG. 1 merely for convenience of illustration, schematically shows several signals which appear in the control signal generator depicted in FIG. 2.
Figure 2:
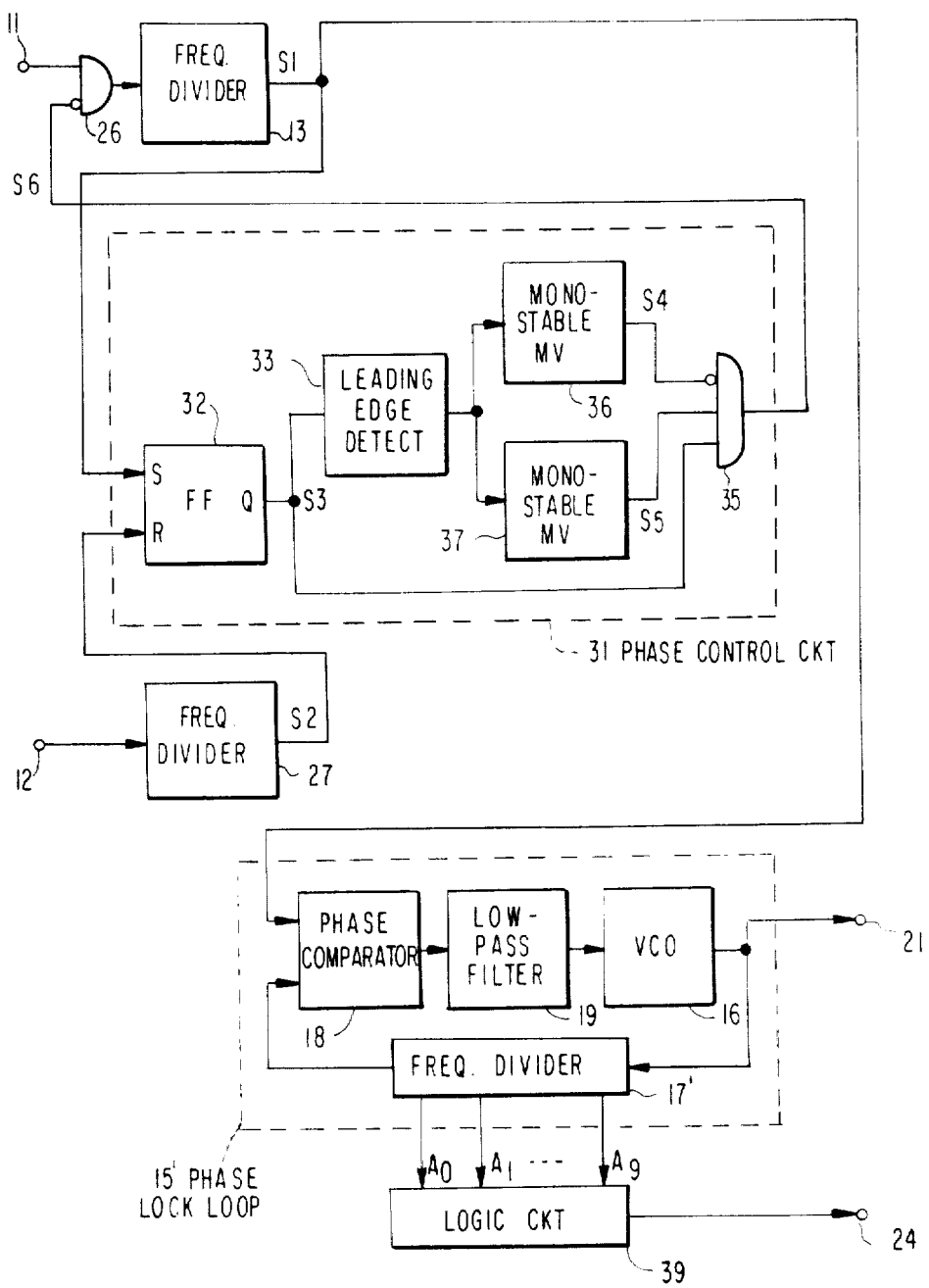
FIG. 2 is a block diagram of a control signal generator according to a first embodiment of the instant invention.

Referring now to FIGS. 2 and 3, a control signal generator according to a first embodiment of this invention, is responsive to a subcarrier signal of a television signal and to a horizontal synchronizing signal thereof for producing a control signal and a sampling or clock pulse sequence, both being of the type described in conjunction with FIG. 1. Similar parts are designated by like reference numerals. For example, the control signal generator has first and second generator input terminals 11 and 12, a first frequency divider 13, and first and second generator output terminals 21 and 24. A phase lock loop 15', corresponding to that described in connection with FIG. 1, comprises a voltage controlled oscillator 16, a phase comparator 18, a low-pass filter 19, and a local frequency divider 17' which corresponds to the local frequency divider 17 of FIG. 1 as will presently become clear.

In the control signal generator being illustrated, a first frequency dividing circuit comprises the first frequency divider 13 and a two-input inhibit gate 26 controlled by a phase control signal S6 (FIG. 3) which will become clear as the description proceeds. The subcarrier signal supplied to the inhibit gate 26, is delivered and not delivered as an inhibitor output signal to the first frequency divider 13 when the phase control signal S6 has a binary zero and a binary one level, respectively. The signal produced by the first frequency dividing circuit and delivered to the phase lock loop 15', will again be called a first frequency divided signal, which is depicted in FIG. 3 at S1 and has a nominal frequency of $f_H/2$.

A second frequency dividing circuit 27 is for frequency dividing the horizontal synchronizing signal by two. The signal produced by the second frequency dividing circuit 27, is illustrated in FIG. 3 at S2 and may again be named a second frequency divided signal.

As exemplified by pulses $a_0$ and $b_0$, which are representative of phases of the first and the second frequency divided signals S1 and S2, the signals S1 and S2 are in phase synchronism in a stationary state of operation of the control signal generator. When a phase jump occurs in the horizontal synchronizing signal by some reason or another, a phase representative pulse $a_1$ of the first frequency divided signal S1 may next follow the pulse $a_0$ at a regular interval of time defined by the nominal frequency $f_H/2$ while a phase representative pulse $b_1$ of the second frequency divided signal S2 may appear before lapse of the regular interval.

The first and the second frequency divided signals S1 and S2 are delivered to a phase control circuit 31 for supplying the inhibit gate 26 with the phase control signal S6 so as to keep the phase difference between the signals S1 and S2 within a prescribed tolerance or time interval T. More specifically, the signals S1 and S2 are supplied to set and reset terminals S and R of a flip-flop circuit 32, which produces a phase difference signal S3 from an output terminal Q thereof. If a phase difference appears between the signals S1 and S2 as indicated by pulses $a(=a_1)$ and b, a phase difference pulse c (FIG. 3) of a variable phase difference pulse width $t_0$ builds up and down in the phase difference signal S3 substantially concurrently with the pulses a and b.

The phase difference signal S3 is delivered to a leading edge detector 33 and a three-input inhibit gate 35. The leading edge detector 33 produces a leading edge signal (not shown), in which a sharp pulse appears at the leading edge of the phase difference pulse c. The leading edge signal is supplied to first and second monostable multivibrators 36 and 37 as a trigger signal. The first monostable multivibrator 36 produces a first output signal S4, in which a first output pulse d (FIG. 3) of a first prescribed pulse width $t_1$ appears in response to the leading edge pulse and which is supplied to the three-input inhibit gate 35 as an inhibit pulse. The first prescribed pulse width $t_1$ is selected so as to define the prescribed tolerance T. Depending on the circumstances, the first output signal S4 and the first output pulse, such as d, will be called a timing signal and a timing pulse, respectively.

The second monostable multivibrator 37 produces a second output signal S5, in which a second output pulse e (FIG. 3) of a second prescribed pulse width $t_2$ appears in response to the leading edge pulse and which is supplied to the three-input inhibit gate 35. The second prescribed pulse width $t_2$ is longer than the first prescribed pulse width $t_1$ and is selected so as to be within the lock-in period of the phase lock loop 15'.

The three-input inhibit gate 35 produces the phase control signal S6, in which a binary one phase control pulse f (FIG. 3) of a phase control pulse width T' builds up upon lapse of the first prescribed pulse width $t_1$ after the leading edge of the pulse e of the second output signal S5 and builds down at the trailing edge of the pulse e. The phase control pulse f therefore appears only when the phase difference pulse c lasts longer than the prescribed tolerance T. During the time in which the phase difference between the first and the second frequency divided signals S1 and S2 is within the prescribed tolerance T as exemplified by pulses a' and b' of the respective signals S1 and S2, the phase control signal S6 is kept at the binary zero level. Incidentally, the phase control pulse width T' is constant so long as the phase difference pulse, such as c, builds down after the second output pulse as, for example e. The phase control pulse width T' becomes short when the phase difference pulse builds down prior to the second output pulse.

Whenever the phase control signal S6 takes the binary one level, the pulses of the first frequency divided signal S1 are delayed in accordance with the phase control pulse widths to approach the pulses of the second frequency divided signal S2. In this manner, the phase control circuit 31 responds to the first and the second frequency divided signals S1 and S2 to phase control the first frequency divided signal S1 so that the signals S1 and S2 may have a phase difference which is limited to the prescribed tolerance T.

In the phase lock loop 15', the voltage controlled oscillator 16 supplies the first generator output terminal 21 with a sampling or clock pulse sequence which is phase synchronized with the first frequency divided signal S1 and has a frequency which is equal to $Mf_H/2$ where M represents a natural number. The local frequency divider 17' frequency divides the sampling pulse sequence by M and delivers the frequency demultiplied signal to the phase comparator 18. Responsive to the frequency demultiplied signal, a logic circuit 39 supplies the control signal to the second generator output terminal 24. It is now understood that a combination of the phase lock loop 15' and the logic circuit 39 serves as a control signal producing circuit responsive to the first frequency divided signal S1 for producing the control signal which has the predetermined pulse pattern and is in phase synchronism with the first frequency divided signal S1 and consequently with the horizontal synchronizing signal.

By way of example, let the control signal be for use in controlling the horizontal blanking period encoding as described heretobefore. According to the NTSC system, the horizontal blanking period is 10 microseconds long in each horizontal scanning period of 63 microseconds. It is therefore preferred that the natural number M be 567. Under the circumstances, the control signal should be binary one and zero while the local frequency divider 17' counts the sampling or clock pulses from 0 up to 89 and from 90 to 566, respectively. The frequency divider 17' produces a count signal of ten bits $A_0$ through $A_9$, the bits $A_0$ and $A_9$ being the least and the most significant bits, respectively.

The logic circuit 39 may be a read-only memory accessible by the count signal. A conversion table for the read-only memory is as follows:

| $A_0$ | $A_1$ | $A_2$ | $A_3$ | $A_4$ | $A_5$ | $A_6$ | $A_7$ | $A_8$ | $A_9$ | Control Signal |
|---|---|---|---|---|---|---|---|---|---|---|
| 0 | 0 | 0 | 0 | 0 | 0 | 0 | 0 | 0 | 0 | 1 |
|   |   |   |   |   |   |   |   |   |   | . |
|   |   |   |   |   |   |   |   |   |   | . |
| 1 | 0 | 0 | 1 | 1 | 0 | 1 | 0 | 0 | 0 | 1 |
| 0 | 1 | 0 | 1 | 1 | 0 | 1 | 0 | 0 | 0 | 0 |
|   |   |   |   |   |   |   |   |   |   | . |

-continued

| $A_0$ | $A_1$ | $A_2$ | $A_3$ | $A_4$ | $A_5$ | $A_6$ | $A_7$ | $A_8$ | $A_9$ | Control Signal |
|---|---|---|---|---|---|---|---|---|---|---|
|   |   |   |   |   |   |   |   |   |   | . |
| 0 | 0 | 1 | 1 | 0 | 1 | 0 | 0 | 0 | 1 | 0 |

Figure 4:
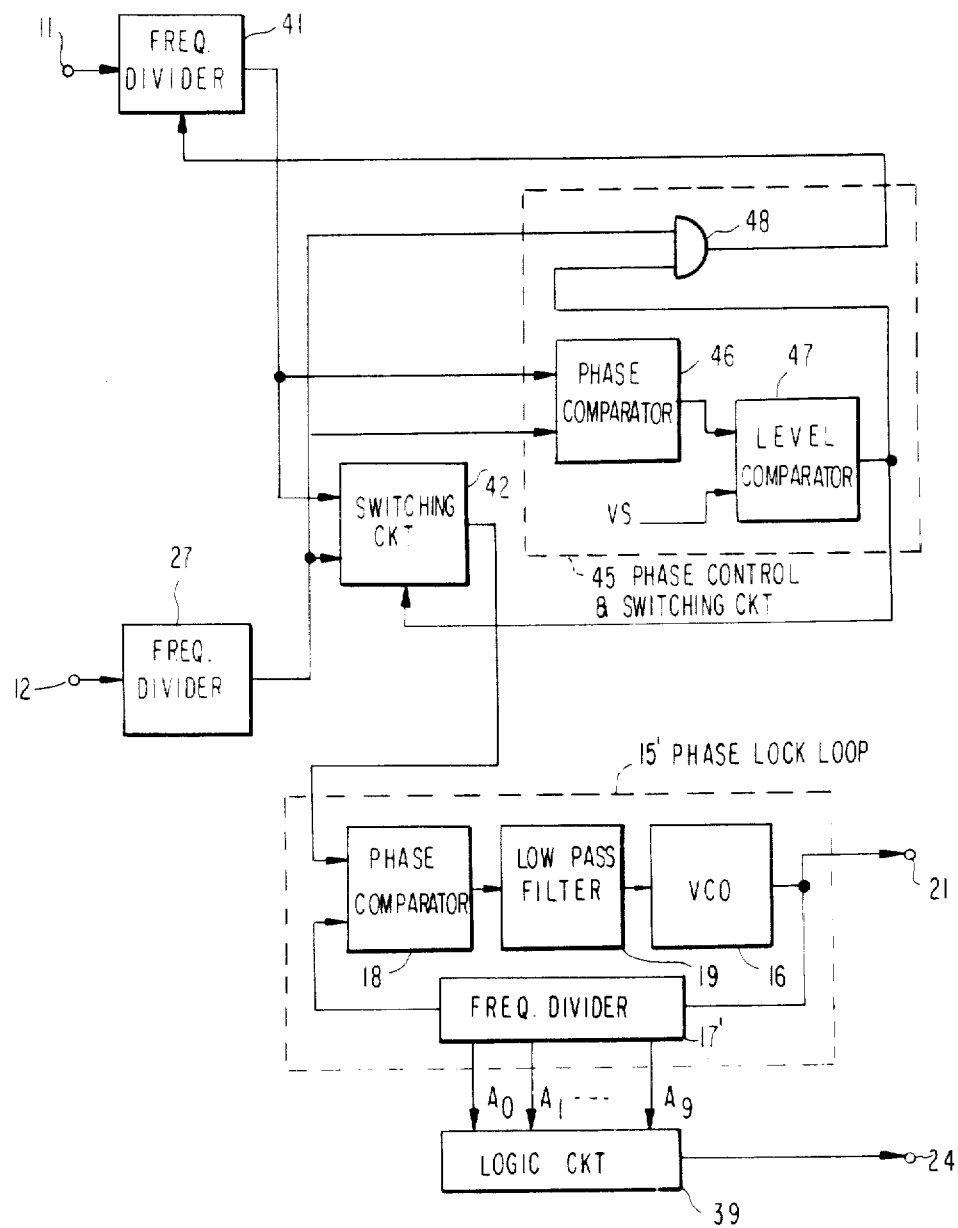
FIG. 4 is a block diagram of a control signal generator according to a second embodiment of this invention.

Turning now to FIG. 4, a control signal generator according to a second embodiment of this invention, is again responsive to a subcarrier signal of a television signal and to a horizontal synchronizing signal thereof for producing a control signal and a sampling or clock pulse sequence, both being of the type described in connection with FIGS. 1 and 2. Similar parts are designated by like reference numerals.

The illustrated control signal generator comprises a first frequency divider 41 which is resettable by a reset signal as will become clear as the description proceeds. Responsive to the subcarrier signal, the first frequency divider 41 produces a first frequency divided signal. A control signal producing circuit is formed of the phase lock loop 15' and the logic circuit 39 as before. The first frequency divided signal is, however, delivered to the phase lock loop 15' through a switching circuit 42 which is controlled by a switching signal as will presently be described.

The second frequency divider 27 of the type described above, frequency divides the horizontal synchronizing signal by two to produce a second frequency divided signal. Like the first frequency divided signal, the second frequency divided signal is delivered to the switching circuit 42. Together with the first frequency divided signal, the second frequency divided signal is supplied to a phase control and switching circuit 45, which produces the resetting signal and the switching signal as follows.

In the phase control and switching circuit 45, a local phase comparator 46 compares the phases of the first and the second frequency divided signals to produce a phase error signal of a level representative of a phase difference which the first frequency divided signal has relative to the second frequency divided signal. A level comparator 47 is for comparing the level of the phase error signal with a reference level VS defined by the prescribed tolerance. The level comparator 47 produces a two-level signal which takes a first and a second level when the level of the phase error signal is lower and not lower than the reference level VS, respectively. In the illustrated example, the first and the second levels are logic zero and one levels, respectively.

The two-level signal is supplied to the switching circuit 42 as the switching signal. The switching circuit 42 produces the first frequency divided signal as a switched output signal when the switching signal takes the first level to indicate that the phase difference is within the prescribed tolerance. When the switching signal takes the second level to indicate that the phase difference is not within the prescribed tolerance, the second frequency divided signal is produced as the switched output signal. In either event, the switched output signal is delivered to the phase lock loop 15'.

A two-input AND gate 48 is supplied with the two-level signal and the second frequency divided signal to produce the resetting signal, in which pulses (as in S2 of FIG. 3) of the second frequency divided signal appear as a phase control signal during the time that the two-level signal takes the second level. The phase control signal is supplied to the first frequency divider 41 to phase control the first frequency divided signal so as to make the phase difference converge to the prescribed tolerance.

It is now understood that a combination of the switching circuit 42 and the phase control and switching circuit 45 serves as a switching and phase controlling circuit responsive to the first and the second frequency divided signals for producing the first and the second frequency divided signals as the switched output signal when a phase difference which the first frequency divided signal has relative to the second frequency divided signal, is within and not within the prescribed tolerance, respectively. Furthermore, the switching and phase controlling circuit is coupled to the first frequency divider 41 so as to phase control the first frequency divided signal to make the phase difference converge to the prescribed tolerance when the phase difference is not within the prescribed tolerance.

While two preferred embodiments of this invention have thus far been described, it will now be readily feasible for one skilled in the art to carry this invention into effect in various other manners. For example, a vertical synchronizing signal may be used in place of the horizontal synchronizing signal. The control signal produced by the control signal generator is not restricted to that described in conjunction with FIG. 2.

What is claimed is:

1. A control signal generator for producing a control signal in phase synchronism with a synchronization signal preselected from a horizontal and a vertical synchronizing signal of a television signal and comprising:
    first frequency dividing means for controllably frequency dividing a subcarrier signal of said television signal to produce a first frequency divided signal;
    second frequency dividing means for frequency dividing said synchronization signal to produce a second frequency divided signal;
    phase control means coupled to said first frequency dividing means and responsive to said first and said second frequency divided signals for phase controlling said first frequency divided signal so as to keep a phase difference which said first frequency divided signal has relative to said second frequency divided signal, within a prescribed tolerance; and
    control signal producing means responsive to said first frequency divided signal for producing said control signal.

2. A control signal generator as claimed in claim 1, wherein:
    said phase control means comprises:
    first means responsive to said first and said second frequency divided signals for producing a phase difference signal in which a phase difference pulse appears to have a phase difference pulse width representative of said phase difference;
    second means responsive to said phase difference signal for producing a timing signal in which a timing pulse appears in response to each phase difference pulse to have a prescribed pulse width defining said prescribed tolerance; and
    third means responsive to said phase difference pulse and the timing pulse produced in response to the last-mentioned phase difference pulse for producing a phase control signal including a phase control pulse of a phase control pulse width which is not longer than the phase difference pulse width of the last-mentioned phase difference pulse minus said prescribed pulse width;
    said first frequency dividing means comprising:
    inhibiting means responsive to said phase control signal for inhibiting said subcarrier signal during presence of each phase control pulse to produce an inhibitor output signal; and
    a frequency divider for frequency dividing said inhibitor output signal to produce said first frequency divided signal.

3. A control signal generator as claimed in claim 2, wherein said third means comprises:
    means responsive to said phase difference pulse for producing a means output signal in which an output pulse builds up substantially concurrently with the last-mentioned phase difference pulse to have a predetermined pulse width which is longer than said prescribed pulse width; and
    means responsive to said phase difference pulse and the timing and the output pulses produced in response to the last-mentioned phase difference pulse for producing said phase control signal with said phase control pulse made to build up upon build down of the last-mentioned timing pulse and build down upon build down of whichever of the last-mentioned phase difference pulse and the last-mentioned output pulse that builds down earlier.

4. A control signal generator for producing a control signal in phase synchronism with a synchronization signal preselected from a horizontal and a vertical synchronizing signal of a television signal and comprising:
    first frequency dividing means for controllably frequency dividing a subcarrier signal of said television signal to produce a first frequency divided signal;
    second frequency dividing means for frequency dividing said synchronization signal to produce a second frequency divided signal;
    switching and phase controlling means responsive to said first and said second frequency divided signals for producing said first and said second frequency divided signals as a switched output signal when a phase difference which said first frequency divided signal has relative to said second frequency divided signal, is within and not within a prescribed tolerance, respectively, said switching and phase controlling means being coupled to said first frequency dividing means for phase controlling said first frequency divided signal so as to make said phase difference converge within said prescribed tolerance when said phase difference is not within said prescribed tolerance; and
    control signal producing means responsive to said switched output signal for producing said control signal.

5. A control signal generator as claimed in claim 4, wherein said switching and phase controlling means comprises:
    first means responsive to said first and said second frequency divided signals for producing a phase error signal of a level representative of said phase difference;
    second means for comparing the level of said phase error signal with a reference level to produce a two-level signal which takes a first and a second level when the level of said phase error signal is lower and not lower than said reference level, respectively, said reference level being defined by said prescribed tolerance;

third means coupled to said first and said second frequency dividing means and responsive to said two-level signal for producing said first and said second frequency divided signals as said switched output signal when said two-level signal takes said first and said second levels, respectively;

fourth means coupled to said second frequency dividing means and responsive to said two-level signal for producing a portion of said second frequency divided signal as a phase control signal while said two-level signal takes said second level; and fifth means coupled to said first frequency dividing means and responsive to said phase control signal for phase controlling said first frequency divided signal so as to make said phase difference converge within said prescribed tolerance when said two-level signal takes said second level.

* * * * *